(12) United States Patent
Craig et al.

(10) Patent No.: US 6,671,309 B1
(45) Date of Patent: *Dec. 30, 2003

(54) INTERFERENCE DIVERSITY IN COMMUNICATIONS NETWORKS

(75) Inventors: Stephen G. Craig, Tullinge (SE); Sverker Magnusson, Stockholm (SE); Erik Edgren, Stockholm (SE); Magnus Thurfjell, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 517 days.

This patent is subject to a terminal disclaimer.

(21) Appl. No.: 09/604,047

(22) Filed: Jun. 26, 2000

Related U.S. Application Data

(63) Continuation-in-part of application No. 09/406,841, filed on Sep. 28, 1999, now Pat. No. 6,233,270.

(51) Int. Cl.$^7$ .................................................. H04B 1/713
(52) U.S. Cl. .................................... 375/132; 375/133
(58) Field of Search ............................. 375/132, 133, 375/134, 135, 136, 137

(56) References Cited

U.S. PATENT DOCUMENTS

| | | | |
|---|---|---|---|
| 4,850,036 A | * | 7/1989 | Smith .......................... 455/502 |
| 5,425,049 A | | 6/1995 | Dent |
| 6,233,270 B1 | * | 5/2001 | Craig et al. .................. 375/132 |

FOREIGN PATENT DOCUMENTS

| | | |
|---|---|---|
| EP | 0 596 699 | 5/1994 |
| WO | WO 93/22849 | 11/1993 |
| WO | WO 97/45966 | 12/1997 |

OTHER PUBLICATIONS

European Search Report No. RS 103848 dated May 24, 2000.

* cited by examiner

*Primary Examiner*—Don N. Vo

(57) ABSTRACT

In a cellular radio telecommunications system that employs frequency hopping, system performance can be significantly improved by more fully exploiting interference diversity, while maintaining frequency diversity, which is already associated with frequency hopping techniques. In order to more fully exploit interference diversity, each mobile station operating in a cell is allocated, in addition to a frequency hopping sequence, a frequency offset hopping sequence such that each mobile station hops from one frequency to the next frequency as a function of the frequency hopping sequence and its allocated frequency offset hopping sequence. This technique is readily applicable to increase both intercell and intracell interference diversity in unsynchronized or synchronized cells.

17 Claims, 14 Drawing Sheets

INTERFERENCE DIVERSITY IN COMMUNICATIONS NETWORKS

This application in a continuation-in-part of application Ser. No. 09/406,841, filed on Sep. 28, 1999, now U.S. Pat. No. 6,233,270.

FIELD OF INVENTION

The present invention relates the field of telecommunications. More particularly, the present invention relates to synchronized and unsynchronized, cellular radio telecommunications systems.

BACKGROUND

Frequency hopping is often employed in cellular, radio telecommunications systems, such as the Global System for Mobile Communication (GSM), to improve system performance. In general, frequency hopping improves system performance by introducing frequency diversity and interference diversity, as will be explained in detail below. Frequency hopping is a well-known technique.

In a radio telecommunications system, frequency diversity is achieved by transmitting each radio telecommunications signal on a sequence of frequencies over time. Each radio signal is transmitted over a sequence of frequencies because radio signals are often subject to amplitude variations called Rayleigh fading. However, Rayleigh fading generally affects radio signals carried on some frequencies more so than other frequencies. Thus, transmitting a radio telecommunications signal over a sequence of different frequencies increases the likelihood that the signal will be received correctly, as it is unlikely that Rayleigh fading will significantly impact each and every frequency over which the radio telecommunications signal is being transmitted. Accordingly, signal quality is improved and overall system performance is enhanced.

On the other hand, Interference diversity works as follows. In addition to fading, a radio signal is often subject to varying degrees of interference caused by traffic on the same frequency (i.e., co-channel interference) and traffic on an adjacent frequency (i.e., adjacent channel interference). If co-channel and/or adjacent channel interference is substantial, the signal quality associated with the radio signal may be severely impacted, so much so, that the connection may be dropped. In theory, frequency hopping, through the introduction of interference diversity, spreads the co-channel and adjacent channel interference amongst numerous end-users, such that the co-channel and adjacent channel interference experienced by a particular end-user is diversified. The overall effect is to raise the signal quality across the network, thereby improving overall system performance.

While frequency hopping improves system performance by improving signal quality, frequency reuse is designed to improve system performance by increasing system capacity. More specifically, frequency reuse permits two or more cells to simultaneously use the same frequency, or group of frequencies, so long as the distance (i.e., the "reuse distance") between the two cells is sufficient to minimize any co-channel interference that might otherwise have an adverse affect on signal quality. However, as the demand for cellular service increases, reuse distances are likely to decrease. And, as reuse distances decrease, co-channel interference is likely to increase.

To limit co-channel interference, fractional loading may be employed. In a cellular network that employs fractional loading, the number of transceivers installed in each cell is less than the number of frequencies allocated to each cell. With synthesizer frequency hopping, each transceiver hops on all the allocated frequencies, but at any instant in time, the number of frequencies being transmitted by any cell is at most equal to the number of installed transceivers. Since each cell in the conventional, unsynchronized network is typically given a different frequency hopping sequence, at any given instant, potentially interfering cells are unlikely to be emitting exactly the same frequencies. The average interference in the network is thereby reduced.

Another technique that is employed to improve overall system performance is known as base station synchronization. In a Time Division Multiple Access (TDMA) system such as GSM, base stations may be synchronized or unsynchronized with respect to each other. In an unsynchronized system, each base station independently transmits and receives radio communication bursts. Consequently, a radio communication burst associated with one base station will overlap in the time domain with two sequential radio communication bursts associated with each of a number of proximally located base stations. In a synchronous system, base stations, typically in groups of three or more, transmit and receive radio communication bursts in a synchronized manner with respect to each other. Thus, the radio communication bursts transmitted by one base station are aligned in the time domain with the radio communication bursts transmitted by the other base stations affiliated with the group of synchronized base stations. Likewise, radio communication bursts received by one base station are aligned in the time domain with the radio communication bursts received by the other base stations affiliated with the group. In general, synchronization provides an element of control, whereby a system or network operator is better able to manage the level of co-channel and adjacent channel interference through careful allocation of frequencies and frequency offsets. However, in order to achieve this additional control, in a system that employs frequency hopping techniques, it is necessary for all synchronized cells to follow the same frequency hopping sequence (i.e., a reference frequency hopping sequence). By providing a mechanism to better control interference through proper and prudent frequency and frequency offset allocation, system performance may be significantly improved. Frequency offset management is particularly useful if fractional loading is employed, as will be discussed further below.

FIG. 1 illustrates a subset of cells A, B, C, A', B' and C' associated with a synchronized, cellular radio telecommunications system 100. System 100, as shown, employs a frequency reuse plan, and more particularly, a one-reuse plan, as all frequencies are potentially used by each cell. Thus, in accordance with the example illustrated in FIG. 1, a mobile station operating in cell A may simultaneously operate over the same frequency as a mobile station operating in cell A'.

In addition, system 100 employs fractional loading and offset management. In accordance with fractional loading and offset management, the group of cells comprising cells A, B and C is allocated a common set of frequencies. If, for example, twelve frequencies 1–12 are allocated, there are inherently twelve frequency offsets 0–11. Then, in any one cell, a fraction of the twelve frequency offsets is assigned. For instance, cell A may be assigned frequency offsets 1, 4, 7, 10, where it will be understood that it is preferred to have at least a few frequency units between each frequency offset assigned to each cell so as to mitigate adjacent channel interference.

In accordance with conventional frequency hopping techniques, a reference frequency hopping sequence is established for the entire system. A mobile station, at handover or call set-up, is then assigned an available frequency offset associated with the cell in which the mobile station is operating. The mobile station hops through a sequence of frequencies that are, over time, offset from the reference frequency hopping sequence by a fixed amount that is equal to its assigned frequency offset. In accordance with the GSM standard, each frequency offset is referred to as a Mobile Allocation Index Offset (i.e., MAIO).

To better illustrate conventional frequency hopping, FIG. 2 depicts an exemplary, reference frequency hopping sequence, over a time period $t_1-t_{10}$, for the telecommunications system 100. As shown, the reference frequency hopping sequence over the time period $t_1-t_{10}$ is [9,5,11,1,3,9,12,10,7,8]. If a first mobile station operating in cell B is, for example, assigned frequency offset zero, the first mobile station will hop through the sequence [9,5,11,1,3,9,12,10,7,8] over the time period $t_1-t_{10}$. If a second mobile station operating in cell A is assigned frequency offset seven, the second mobile station will hop through the sequence [4,12,6,8,10,4,7,5,2,3] over the time period $t_1-t_{10}$. It is important to reiterate that in accordance with conventional frequency hopping techniques, the frequency offset assigned to each mobile station remains constant. Thus, the frequency offset between the first mobile station operating in cell B and the second mobile station operating in cell A remains fixed; in this case, it remains fixed at seven.

FIGS. 3A–3C illustrate, more clearly, conventional frequency hopping as it applies to several mobile stations operating in telecommunications system 100, where the reference frequency hopping sequence illustrated in FIG. 2 is assumed. More specifically, FIG. 3A illustrates three exemplary mobile stations operating in cell A, where each of these three mobile stations is assigned a frequency offset (i.e., a MAIO) of 4, 10 and 1 respectively. Accordingly, the mobile station represented by the symbol "○" is assigned a frequency offset of 4. Accordingly, this mobile station follows the frequency hopping sequence [1,9,3,5,7,1,4,2,11,12] over the time period $t_1-t_{10}$. The mobile station represented by the symbol "□" is assigned a frequency offset of 10. Accordingly, it follows the frequency hopping sequence [7,3,9,11,1,7,10,8,5,6] over the time period $t_1-t_{10}$. The mobile station represented by the symbol "☆" is assigned a frequency offset of 1. Thus, it follows the frequency hopping sequence [10,6,12,2,4,10,1,11,8,9] over the time period $t_1-t_{10}$.

FIG. 3B illustrates one exemplary mobile station operating in cell C, wherein the one exemplary mobile station is represented by the symbol "▲", and wherein this one exemplary mobile station is assigned a frequency offset 2. Accordingly, the mobile station follows the frequency hopping sequence [11,7,1,3,5,11,2,12,9,10] over the time period $t_1-t_{10}$.

FIG. 3C illustrates two exemplary mobile stations operating in cell A', wherein these two mobile stations are represented by the symbols "X" and "●", and wherein the two mobile stations are assigned a frequency offset of 10 and 1 respectively. Thus, over the time period $t_1-t_{10}$, the mobile station represented by the symbol "X" follows the frequency hopping sequence [7,3,9,11,1,7,10,8,5,6], just as the mobile station represented by the symbol "□" operating in cell A. Similarly, the mobile station represented by the symbol "●" follows the frequency hopping sequence [10,6,12,2,4,10,1,11,8,9], just as the mobile station represented by the symbol "☆" operating in cell A.

As explained above, frequency reuse and fractional loading may limit interference diversity in systems such as telecommunications system 100, and in turn, the efficacy of conventional frequency hopping. This is best illustrated in FIGS. 3D–3F, wherein FIG. 3D, for example, illustrates the frequency offset, over the time period $t_1-t_{10}$, between the three mobile stations operating in cell A. As shown by graph $R_{(☆, ○)}$, there is no interference diversity between the mobile station represented by the symbol "☆" and the mobile station represented by the symbol "○", as the frequency offset remains fixed at three frequency units. Likewise, graph $S_{(○, □)}$ indicates that there is no interference diversity between the mobile station represented by the symbol "○" and the mobile station represented by the symbol "□", as the frequency offset remains fixed at six frequency units. Finally, as shown by graph $T_{(□,☆)}$, there is no interference diversity between the mobile station represented by the symbol "□" and the mobile station represented by the symbol "☆", as the frequency offset remains fixed at 9 frequency units. However, despite the fact that graphs $R_{(☆,○)}$, $S_{(○, □)}$ and $T_{(□,☆)}$ indicate that there is no interference diversity, there is no co-channel interference between these mobile stations, as the mobile stations are never simultaneously operating over the same frequency. Nor is there any adjacent channel interference between the mobile stations, as the mobile stations, by virtue of the frequency offsets assigned to cell A, are never operating on adjacent frequency channels. Therefore, the lack of interference diversity between the mobile stations operating in cell A is not likely to result in any signal degradation.

The problems associated with the lack of interference diversity, and in particular, adjacent channel interference diversity, becomes more evident in FIG. 3E. FIG. 3E illustrates the frequency offset between the one exemplary mobile station operating in cell C, represented by the symbol "▲", and the mobile station operating in cell A, represented by the symbol "☆", over the time period $t_1-t_{10}$. Similar to the graphs presented in FIG. 3D, the graph $U_{(▲,☆)}$ in FIG. 3E indicates that there is no interference diversity between the mobile station represented by the symbol "▲" and the mobile station represented by the symbol "☆". More importantly, the graph $U_{(▲,☆)}$ indicates that there is no adjacent channel interference diversity between these mobile stations, as the frequency offset between the two mobile stations, over time, remains fixed at only one frequency unit. Regardless, this lack of adjacent channel interference diversity may not be problematic unless the offending mobile station is operating at or near the cell periphery, and/or the power level associated with the offending mobile station is significantly strong.

Although the lack of adjacent channel interference diversity associated with conventional frequency hopping can be a problem, as shown in FIG. 3E, the primary problem associated with conventional frequency hopping techniques is the lack of co-channel interference diversity, as illustrated in FIG. 3F. FIG. 3F illustrates the frequency offset between the mobile station represented by the symbol "□", operating in cell A, and the mobile station represented by the symbol "X", operating in cell A', over the time period $t_1-t_{10}$. FIG. 3F also illustrates the frequency offset between the mobile station represented by the symbol "☆" operating in cell A, and the two mobile station represented by the symbol "●", operating in cell A'. As indicated by the graph $T_{(□,X),(☆,●)}$, there is no interference diversity, and in particular, no co-channel interference diversity, between the mobile stations, as the frequency offset between the mobile stations, represented by "□" and "X", and the frequency offset between the mobile stations represented by "☆" and "●" are fixed at zero (0) frequency units. As one skilled in the art will readily appreciate, the likelihood that these mobile stations will serve as a source of severe co-channel interference with respect to each other is relatively high. Moreover, this likelihood increases as the power levels associated with the mobile stations increase, and/or the reuse distance separating cells A and A' decreases.

Given the fact that reuse distances are likely to decrease in time, as the demand for cellular services continues to increase, and given the fact that conventional frequency hopping techniques cannot, as described above, fully exploit the potential of synchronization due to inadequate co-channel interference diversity, and to a lesser extent, adjacent channel interference diversity, it is of particular interest to provide a frequency hopping technique that maximizes interference diversity, particularly in synchronized, cellular, radio telecommunications systems.

SUMMARY OF THE INVENTION

The present invention improves system performance in cellular radio telecommunications systems by providing a frequency hopping technique that further employs frequency offset hopping. In so doing, adjacent channel and co-channel interference diversity are maximized for end-users operating in a cell and nearby cells, without compromising the frequency diversity achieved through conventional frequency hopping.

Accordingly, it is an object of the present invention to improve system performance in a synchronized or unsynchronized cellular radio telecommunications system that employs frequency hopping.

It is another object of the present invention to improve system performance in a cellular radio telecommunications system that employs frequency hopping by minimizing co-channel interference and adjacent channel interference.

It is yet another object of the present invention to more fully exploit the advantages of co-channel and adjacent channel interference diversity in a cellular radio telecommunications system that employs frequency hopping.

In accordance with one aspect of the present invention, the above-identified and other objectives are achieved by employing an apparatus and/or a method in a cellular radio telecommunications system that employs frequency hopping. The apparatus and/or the method involves establishing a frequency hopping sequence for each of a plurality of cells and assigning a number of frequency offsets to each of the plurality of cells. A first frequency offset hopping sequence is then assigned to a first mobile station operating in a first one of the plurality of cells, where each frequency offset associated with the first frequency offset hopping sequence is one of the number of frequency offsets assigned to the first one of the plurality of cells. The first mobile station then hops from one frequency to the next frequency as a function of the frequency hopping sequence plus the first frequency offset hopping sequence.

In accordance with another aspect of the present invention, the above-identified and other objectives are achieved by employing a method for maximizing interference diversity. This method involves establishing a frequency hopping sequence for each of a group of cells, where each of the cells contains a base station, and assigning a number of frequency offsets to each of the cells. Further, a first frequency offset hopping sequence is assigned to a first mobile station operating in a first one of the cells, where each frequency offset associated with the first frequency offset hopping sequence is one of the number of frequency offsets assigned to the first cell. Over a given period of time, the first mobile station hops from one frequency to the next frequency as a function of the frequency hopping sequence and the first frequency offset hopping sequence.

Further, in accordance with another aspect of the present invention, the above-identified and other objectives are achieved by employing a frequency hopping method that involves establishing a reference frequency hopping sequence, allocating a common set of frequencies to each of a first plurality of synchronized cells, and assigning a number of frequency offsets to each of the first plurality of cells, where no two of the first plurality of cells share a frequency offset. A first frequency offset hopping sequence is then assigned to a first mobile station operating in a first one of the first plurality of cells, where each frequency offset associated with the first frequency offset hopping sequence is one of the number of frequency offsets assigned to the first one of the first plurality of cells. Moreover, the first mobile station follows a frequency hopping sequence that is a function of the reference frequency hopping sequence plus the first frequency offset hopping sequence.

In accordance with yet another aspect of the present invention, the above-identified and other objectives are achieved by employing a method for maximizing interference diversity. This method involves establishing a reference frequency hopping sequence for a plurality of cells, where each of the plurality of cells contains a base station, and where each base station is synchronized with each of the other base stations. The method also involves allocating a set of frequencies 1 ... N to a first group of cells associated with the plurality of cells, where a set of frequency offsets 0 ... N−1 corresponds with the set of frequencies 1 ... N, and assigning a number of the frequency offsets 0 ... N−1 to each of the cells associated with the first group of cells, where no two cells associated with the first group of cells share a frequency offset, and where no two frequency offsets assigned to one of the cells associated with the first group of cells are adjacent to one another. Furthermore, a first frequency offset hopping sequence is assigned to a first mobile station operating in a first cell belonging to the first group of cells, where each frequency offset associated with the first frequency offset hopping sequence is one of the number of frequency offsets assigned to the first cell. The first mobile station, over a given time period, follows a frequency hopping sequence that is a function of the reference frequency hopping sequence plus the first frequency offset hopping sequence.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present invention increases the traffic load potential, and therefore, system performance in cellular radio telecommunications systems which employ frequency hopping techniques. In general, the present invention accomplishes this by employing a frequency hopping technique that, in addition to frequency hopping, employs frequency offset hopping. This frequency hopping plus frequency offset hopping technique more effectively exploits the benefits associated with synchronized systems, by maximizing interference diversity. Moreover, the present invention accomplishes this without compromising frequency diversity.

Figure 1:
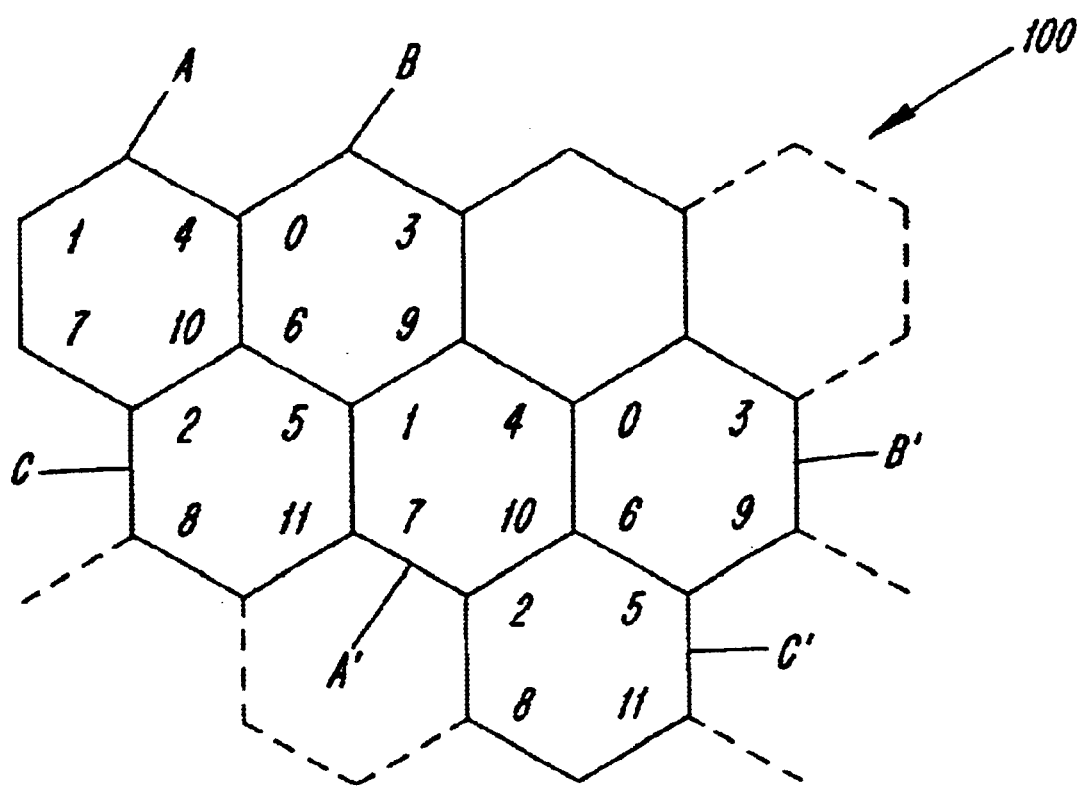
FIG. 1 illustrates a synchronized, cellular radio telecommunications system that employs frequency reuse and fractional loading with frequency offset management.
Figure 2:
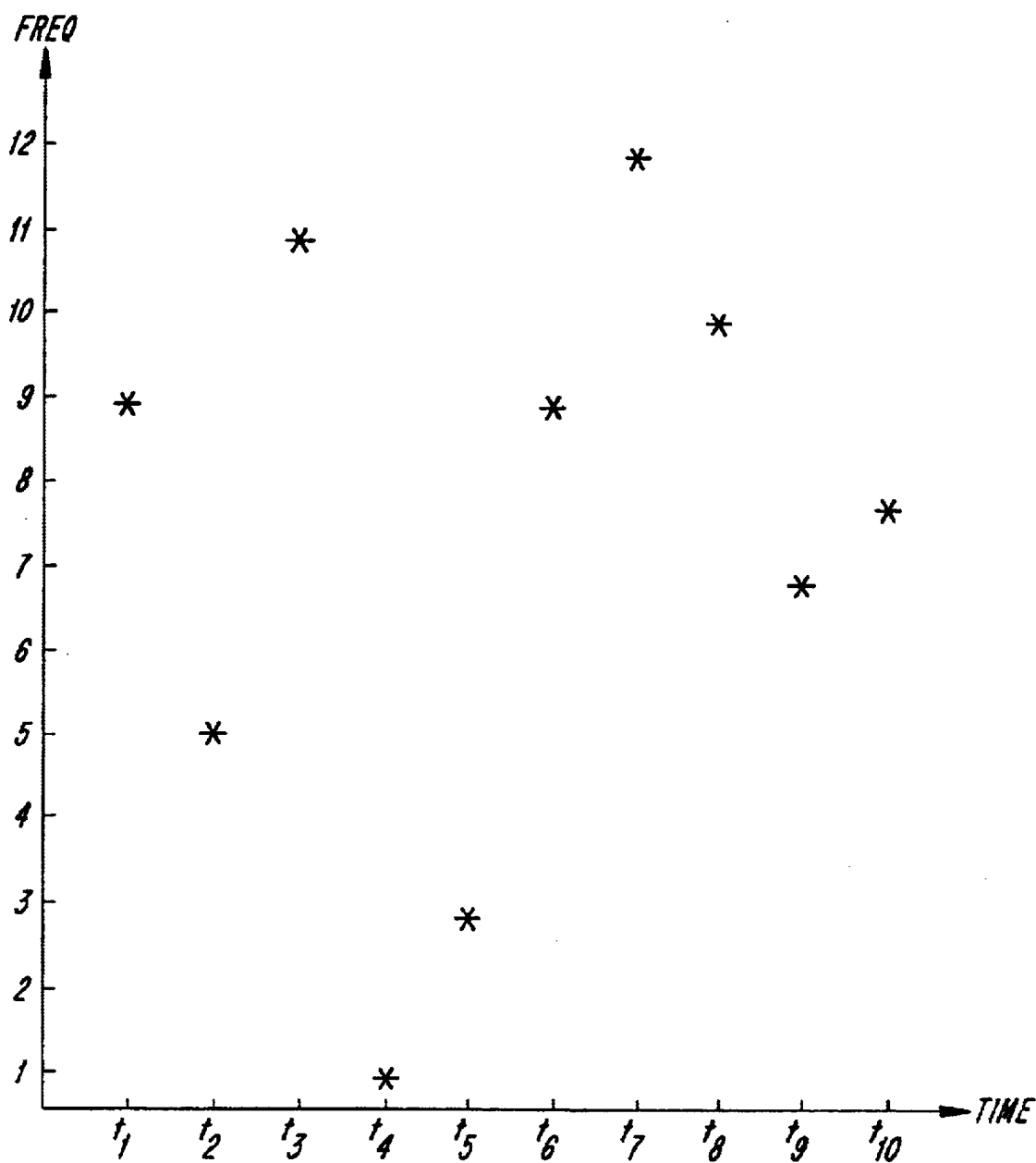
FIG. 2 illustrates an exemplary, reference frequency hopping sequence.

In accordance with exemplary embodiments of the present invention, each group of synchronized cells is allocated a common set of frequencies, such as, the twelve frequencies allocated to the group of synchronized cells A, B, C shown in FIG. 1. Furthermore, a reference frequency hopping sequence is employed, in much the same manner as in conventional frequency hopping techniques. Again, an exemplary, reference frequency hopping sequence is illustrated in FIG. 2. In addition, each cell in each group of synchronized cells is assigned a number of frequency offsets, which is typically a fraction of the total number of frequency offsets associated with the common set of frequencies allocated to the group of cells. Thus, if there are twelve frequencies allocated, there are twelve possible frequency offsets 0–11. In the example of FIG. 1, cell A has been assigned four of the twelve frequency offsets, and more specifically, frequency offsets [1,4,7,10]. Cell B has been assigned frequency offsets [0,3,6,9]. Cell C has been assigned frequency offsets [2,5,8,11].

In order to more fully exploit the benefits associated with synchronized systems, and to maximize interference diversity, the present invention employs a frequency hopping technique that differs from conventional frequency hopping techniques in that it further includes frequency offset hopping, as stated above. In accordance with exemplary embodiments of the present invention, each mobile station is assigned, at handover or at call set-up, a different frequency offset hopping sequence which comprises a series of frequency offsets which are assigned to the cell in which the mobile station is operating. Thus, each mobile station, will hop from one frequency to another as a function of the reference frequency hopping sequence plus the frequency offset hopping sequence it has been assigned. By employing different frequency offset hopping sequences, interference diversity among the mobile stations is guaranteed, while maintaining frequency diversity.

Figure 4A:
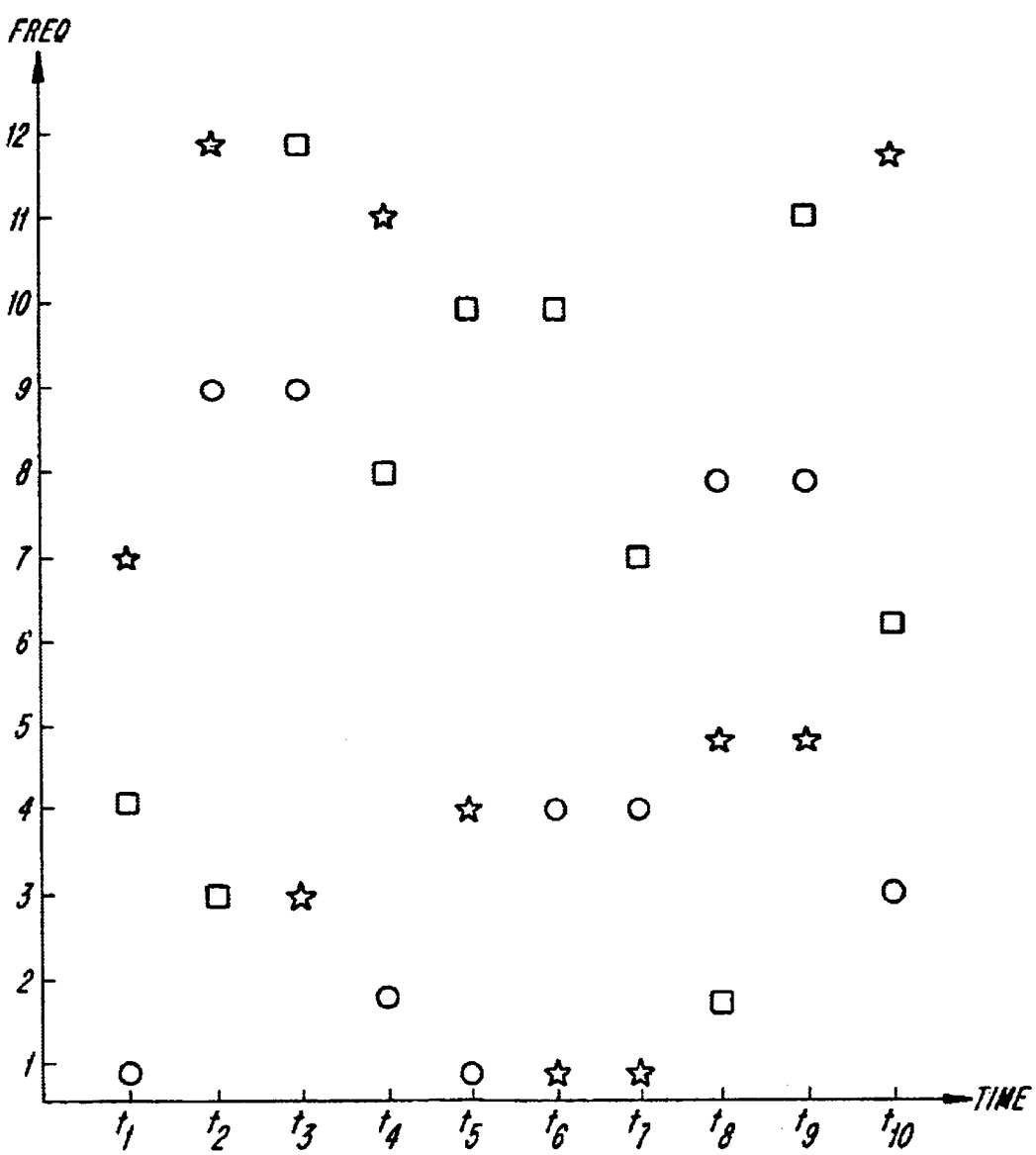
FIGS. 4A–4C illustrate frequency hopping amongst a number of mobile station operating in a plurality of synchronized cells, in accordance with exemplary embodiments of the present invention.
Figure 4B:
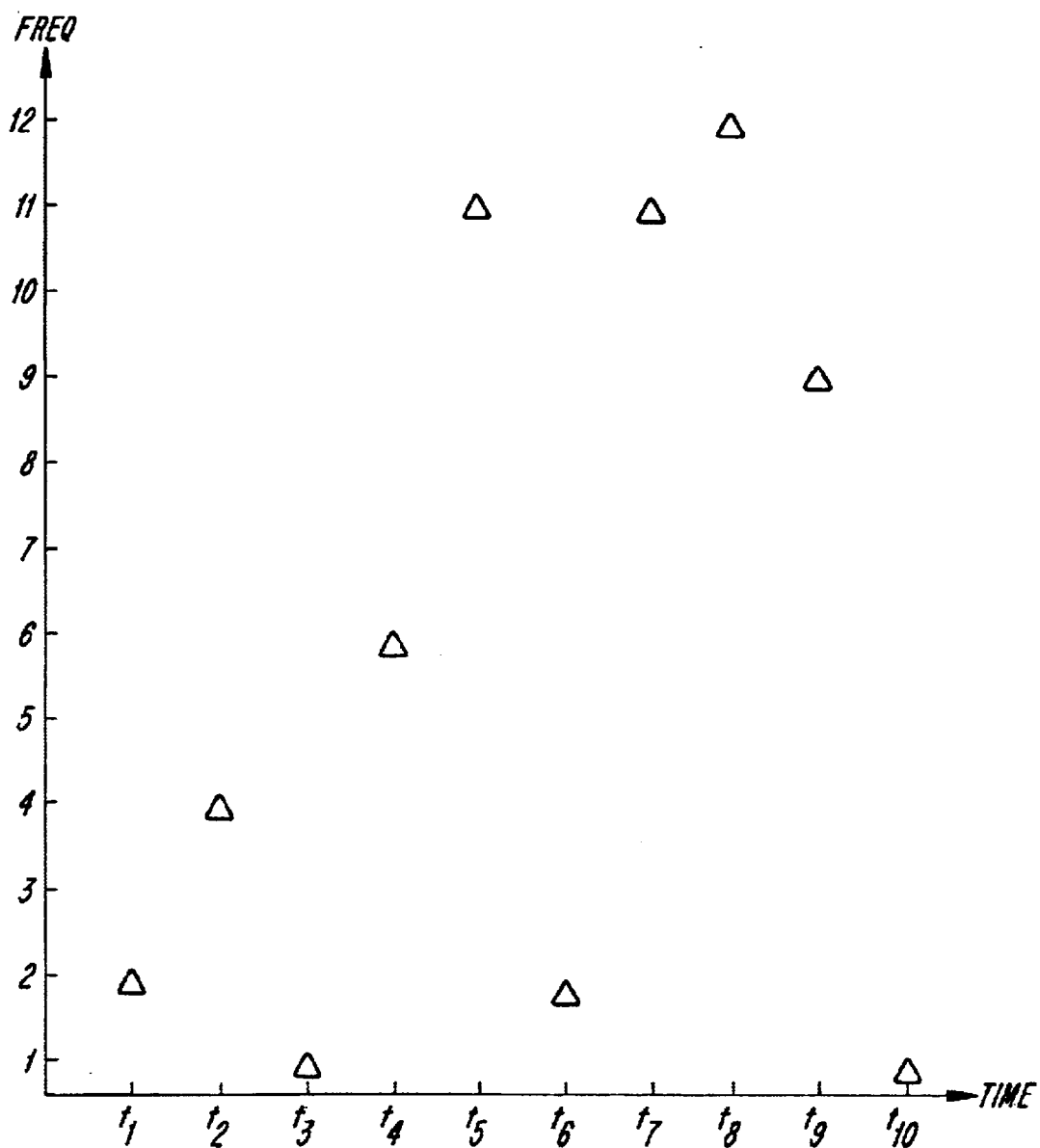
Figure 4C:
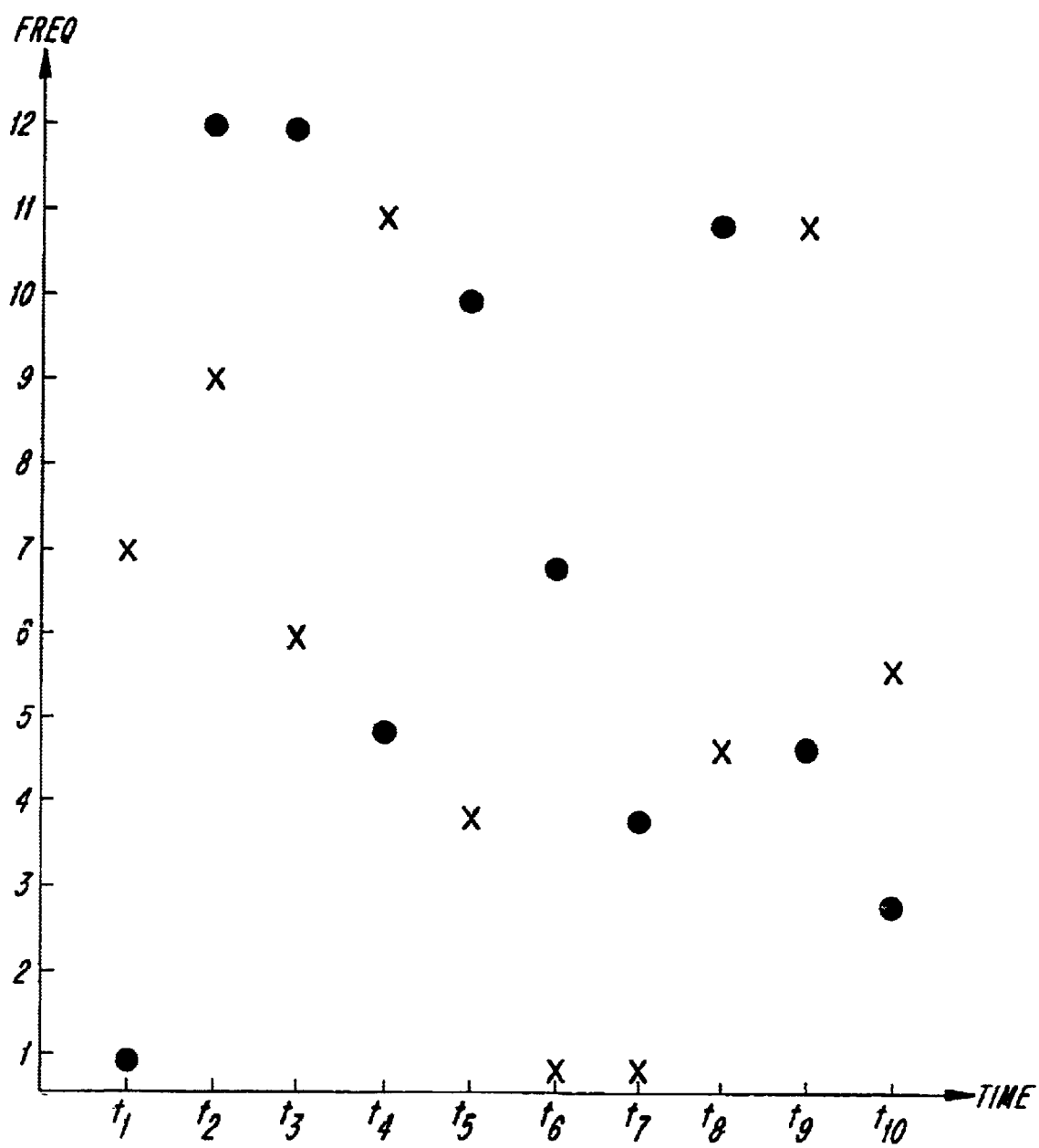

FIGS. 4A–4C more clearly illustrate the frequency offset hopping technique, in accordance with exemplary embodiments of the present invention. More particularly, FIG. 4A illustrates an exemplary frequency hopping sequence associated with each of the three mobile stations operating in cell A of FIG. 1 over the time period $t_1$–$t_{10}$, where the frequency offset hopping technique of the present invention is employed. In the example illustrated in FIG. 4A, the first of the three mobile stations, represented by the symbol "○", is assigned the frequency offset hopping sequence [4,4,10,1, 10,7,4,10,1,7]. Accordingly, the frequency hopping sequence for this first mobile station is [1,9,9,2,1,4,4,8,8,3], where the frequency hopping sequence is a function of the reference frequency hopping sequence plus the frequency offset hopping sequence assigned to the mobile station. The second mobile station, represented by the symbol "□" is assigned the frequency offset hopping sequence [7,10,1,7, 7,1,7,4,4,10]. Accordingly, the frequency hopping sequence for this mobile station is [4,3,12,8,10,10,7,2,11,6]. The third mobile station, represented by the symbol "☆", is assigned the frequency offset hopping sequence [10,7,4,10,1,4,1,7, 10,4]. Accordingly, the frequency hopping sequence for this mobile station is [7,12,3,11,4,1,1,5,5,12]. It will be understood that at =any given instant, each of the three mobile stations is communicating over a frequency that reflects a different one of the available frequency offsets. Moreover, it will be understood that the frequency offset hopping sequence may be repeated after a designated period of time, for example, the time period $t_1$–$t_{10}$.

Similarly, FIG. 4B illustrates the frequency hopping sequence associated with the one mobile station, represented by the symbol "▲", operating in cell C over the time period $t_1$–$t_{10}$. In this example, the mobile station is assigned the frequency offset hopping sequence [5,11,2,5,8,5,11,2,2,5]. Therefore, its frequency hopping sequence is [2,4,1,6,11,2, 11,12,9,1]. Again, the frequency hopping sequence of the mobile station is a function of the reference frequency hopping sequence plus the frequency offset hopping sequence assigned to the mobile station.

FIG. 4C then illustrates the frequency hopping sequences associated with the two mobile stations operating in cell A' of FIG. 1, where the two mobile stations are represented by the symbols "X" and "●" respectively. If, for example, the frequency offset hopping sequence assigned to the first mobile station in cell A' is [10,4,7,10,1,4,1,7,4,10], the first mobile station in cell A' would follow the frequency hopping sequence [7,9,6,11,4,1,1,5,11,6] over the time period $t_1$–$t_{10}$, as shown. If the frequency offset hopping sequence assigned to the second mobile station operating in cell A' is [4,7,1, 4,7,10,4,1,10,7], then the frequency hopping sequence followed by the second mobile station over the time period $t_1$–$t_{10}$ is [1,12,12,5,10,7,4,11,5,3], as shown.

Figure 3A:
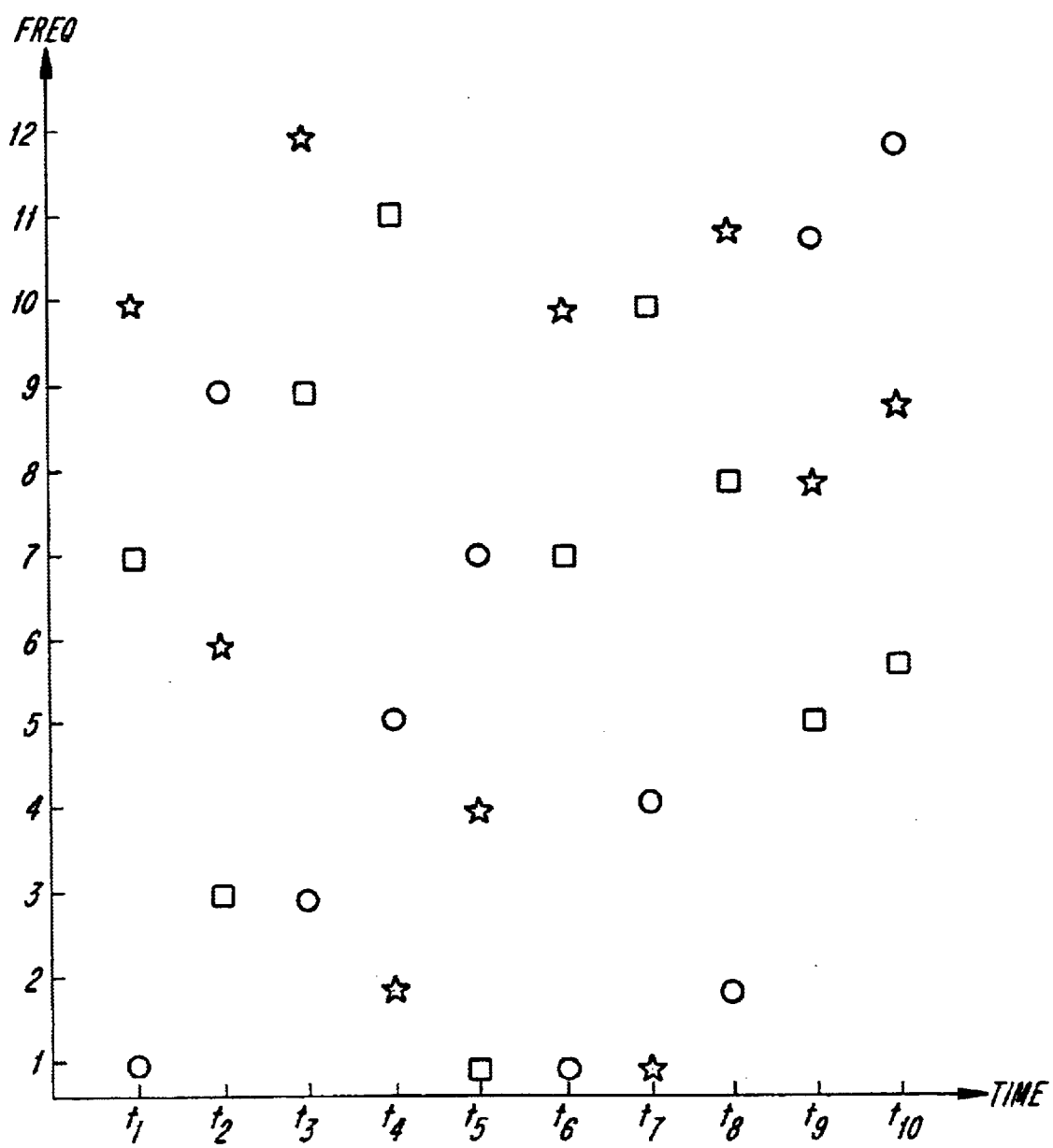
FIGS. 3A–3C illustrate conventional frequency hopping amongst a number of mobile stations operating in a plurality of synchronized cells.
Figure 3B:
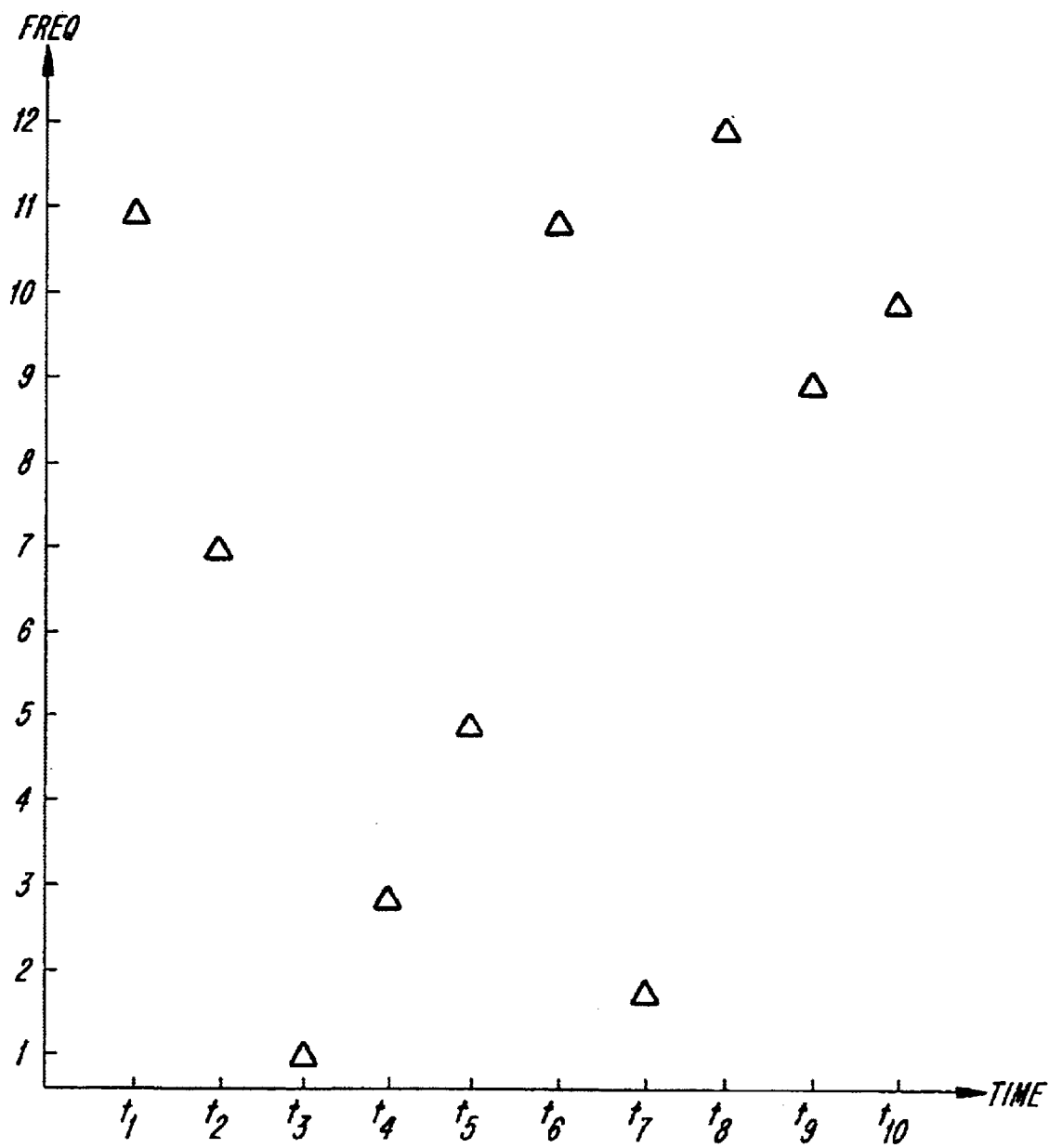
Figure 3C:
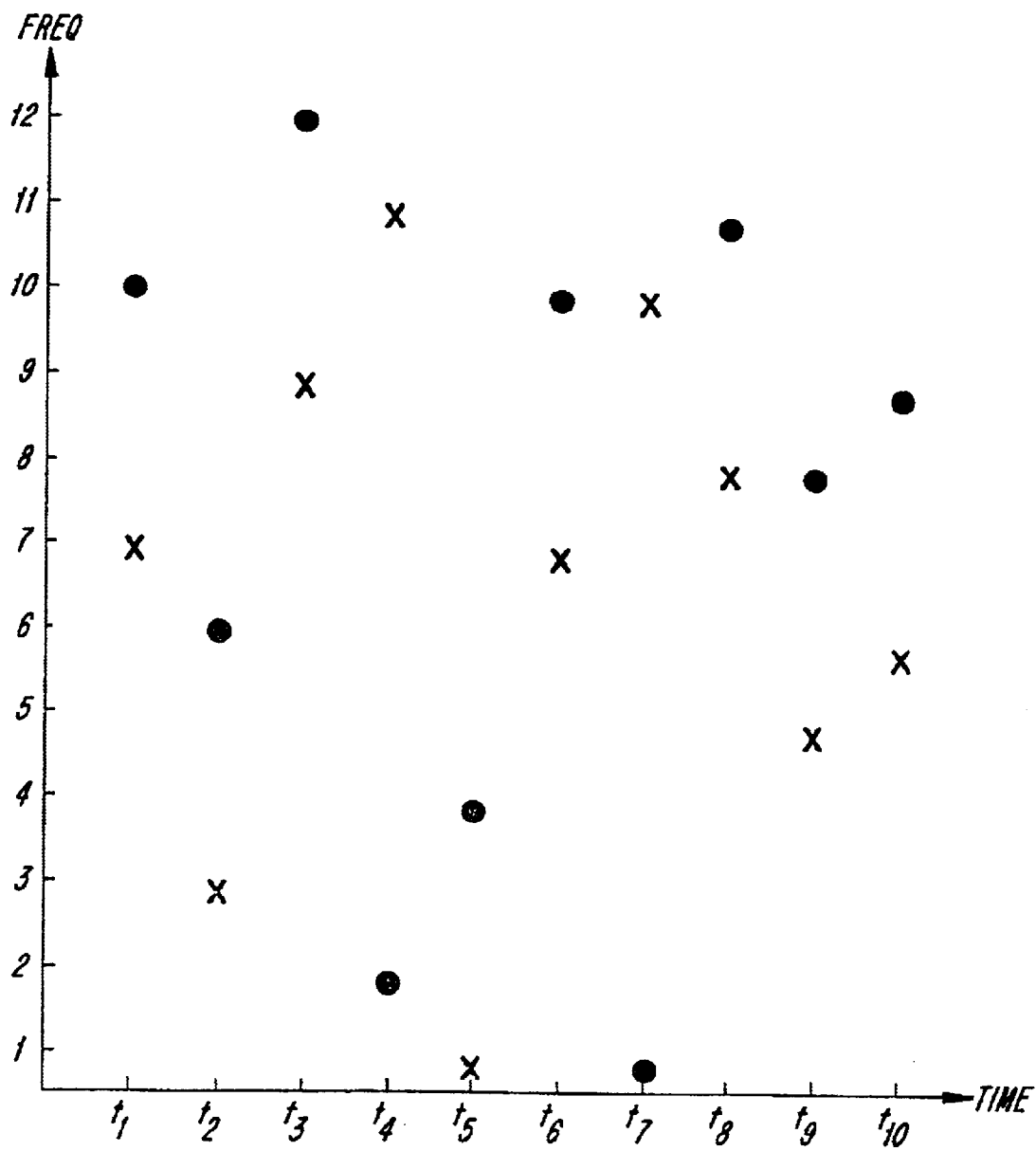
Figure 3D:
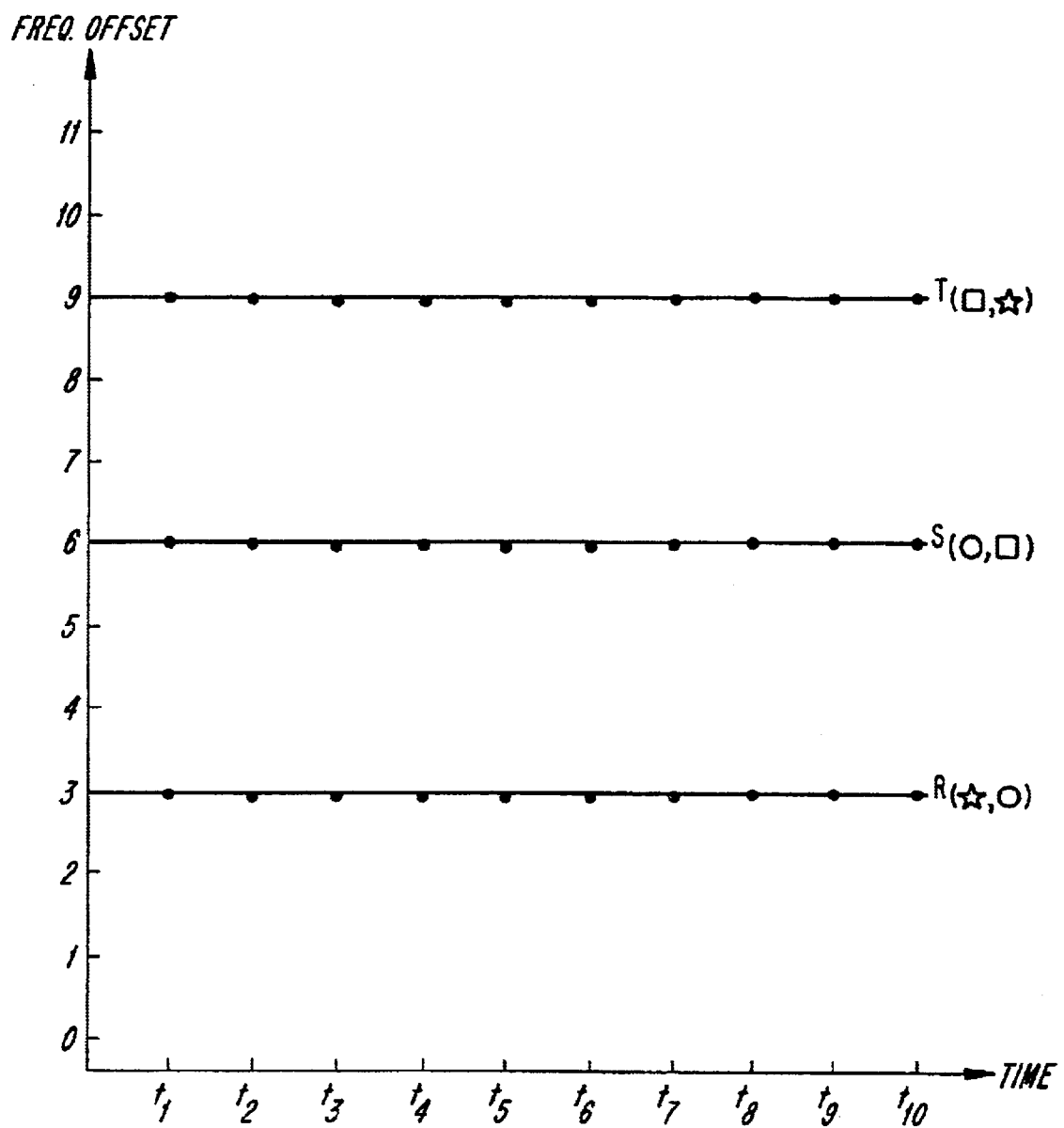
FIGS. 3D–3F illustrate the lack of interference diversity, and in particular, the lack of adjacent channel interference diversity and co-channel interference diversity in systems employing conventional frequency hopping.
Figure 4D:
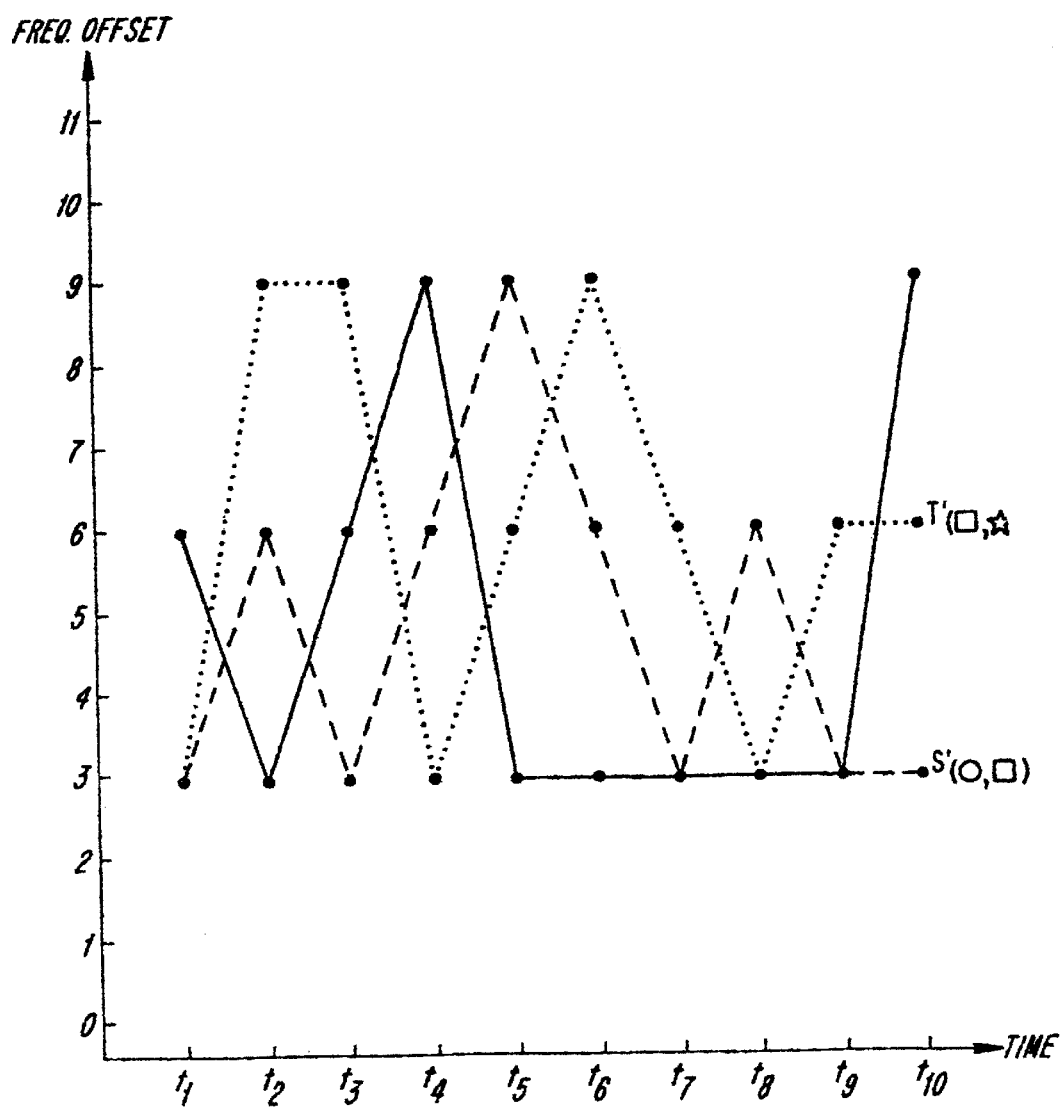
FIGS. 4D–4F illustrate how interference diversity is more fully achieved when the frequency offset hopping technique of the present invention is employed.
Figure 4E:
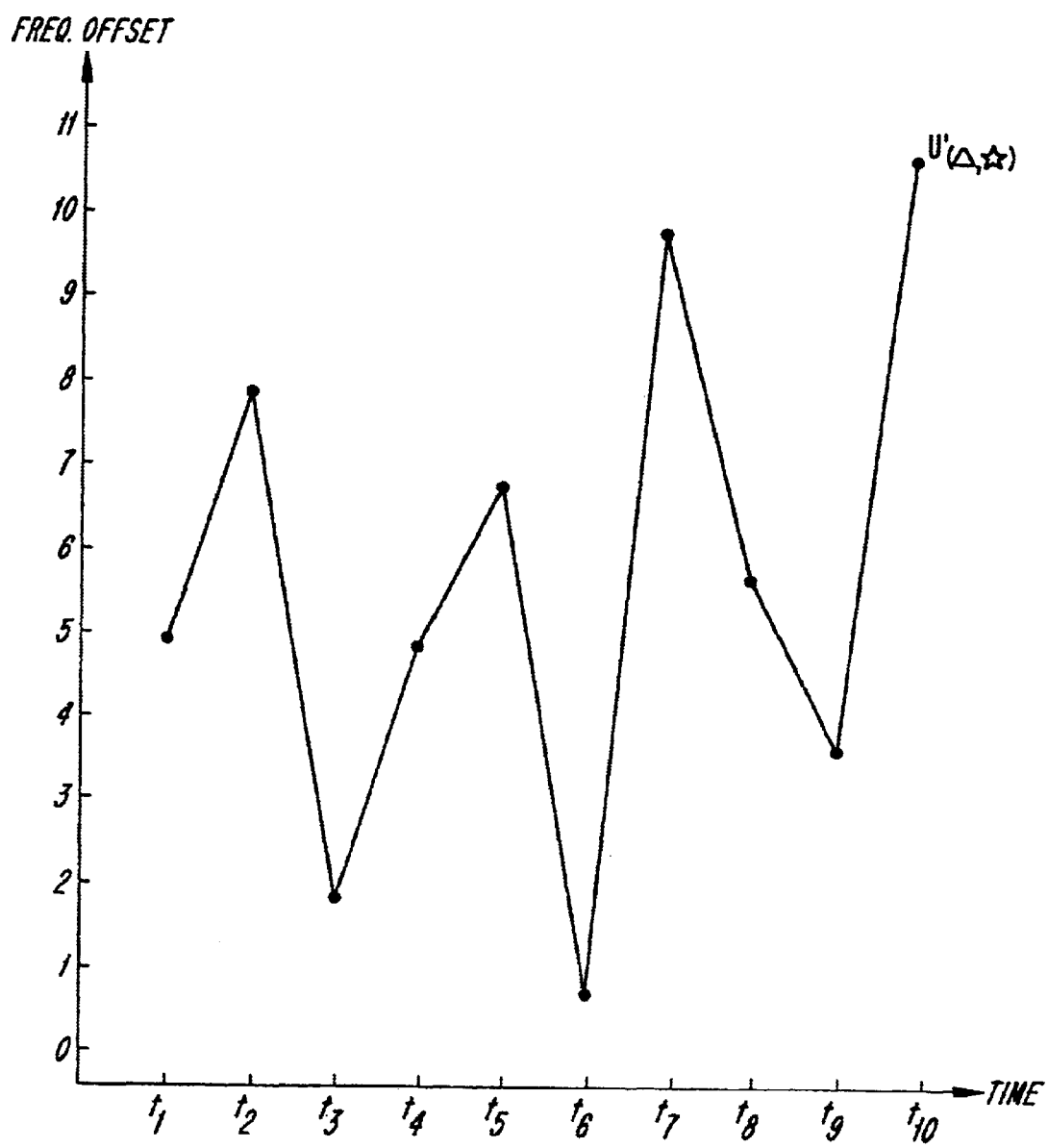
Figure 4F:
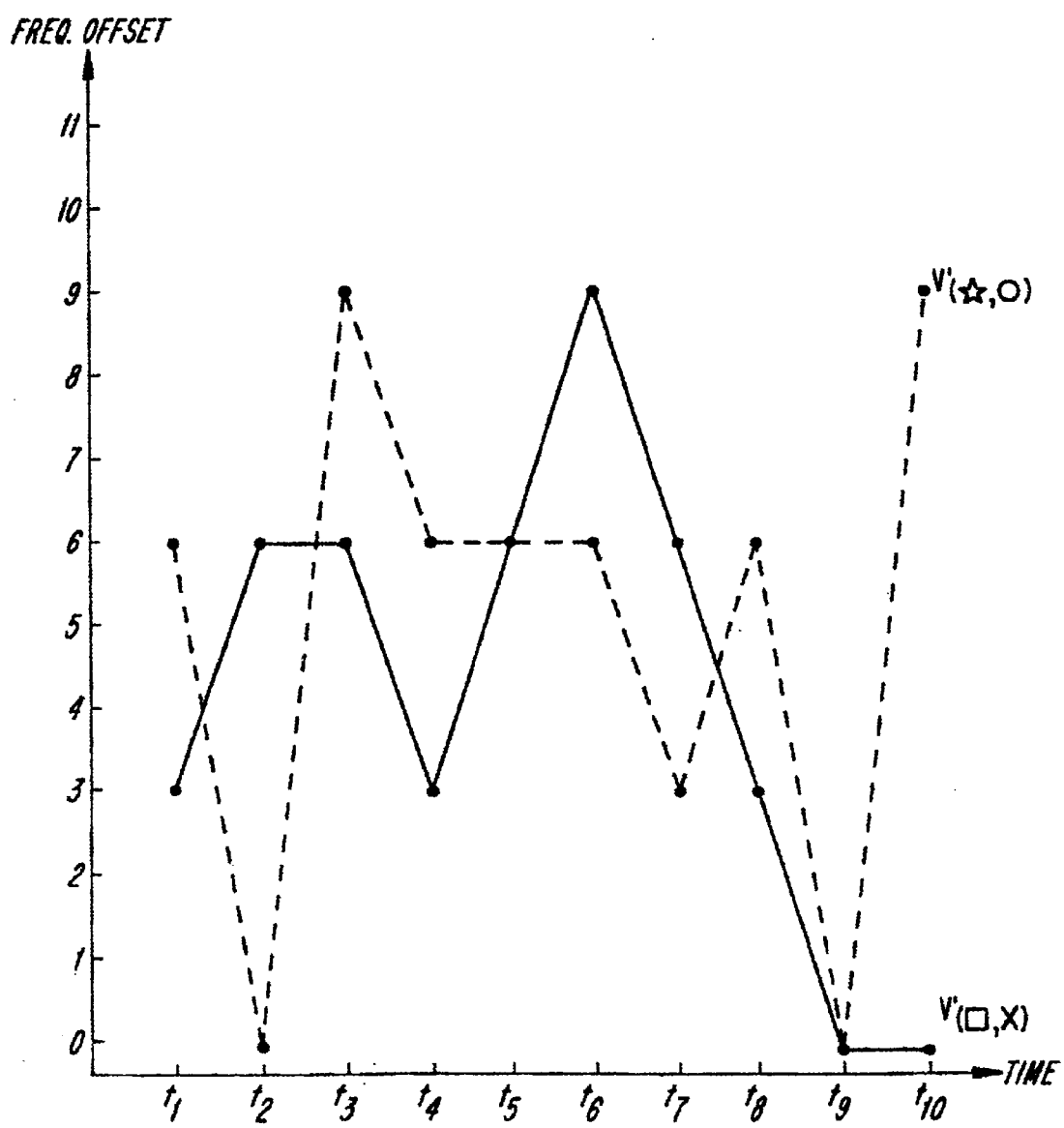

While FIGS. 4A–C illustrate exemplary frequency hopping sequences for the various mobile stations operating in cells A, C and A' over the time period $t_1$–$t_{10}$, in accordance with exemplary embodiments of the present invention, FIGS. 4D–4F illustrate the benefits achieved by employing the frequency offset hopping technique of the present invention. More particularly, FIG. 4D illustrates the frequency offset between the three mobile stations operating in cell A, where the graph $R'_{(☆,○)}$ characterizes the frequency offset between the mobile station represented by the symbol "☆" and the mobile station represented by the symbol "○"; the graph $S'_{(58,☆)}$ characterizes the frequency offset between the mobile station represented by the symbol "○" and the mobile station represented by the symbol "○"; and the graph $T'_{(□,☆)}$ characterizes the frequency offset between the mobile station represented by the symbol "□" and the mobile station represented by the symbol "☆". As shown in FIG. 4D, the frequency offset between the mobile stations is not fixed when frequency offset hopping is employed, in contrast with conventional techniques. A comparison between the graphs $R_{(☆,○)}$, $S_{(○,□)}$ and $T_{(□,☆)}$ in FIG. 3D and the graphs $R'_{(☆,○)}$, $S'_{(○,□)}$ and $T'_{(58,☆)}$ in FIG. 4D highlight the different results achieved when employing conventional frequency hopping as compared to frequency hopping plus frequency offset hopping in accordance with the present invention.

Figure 3E:
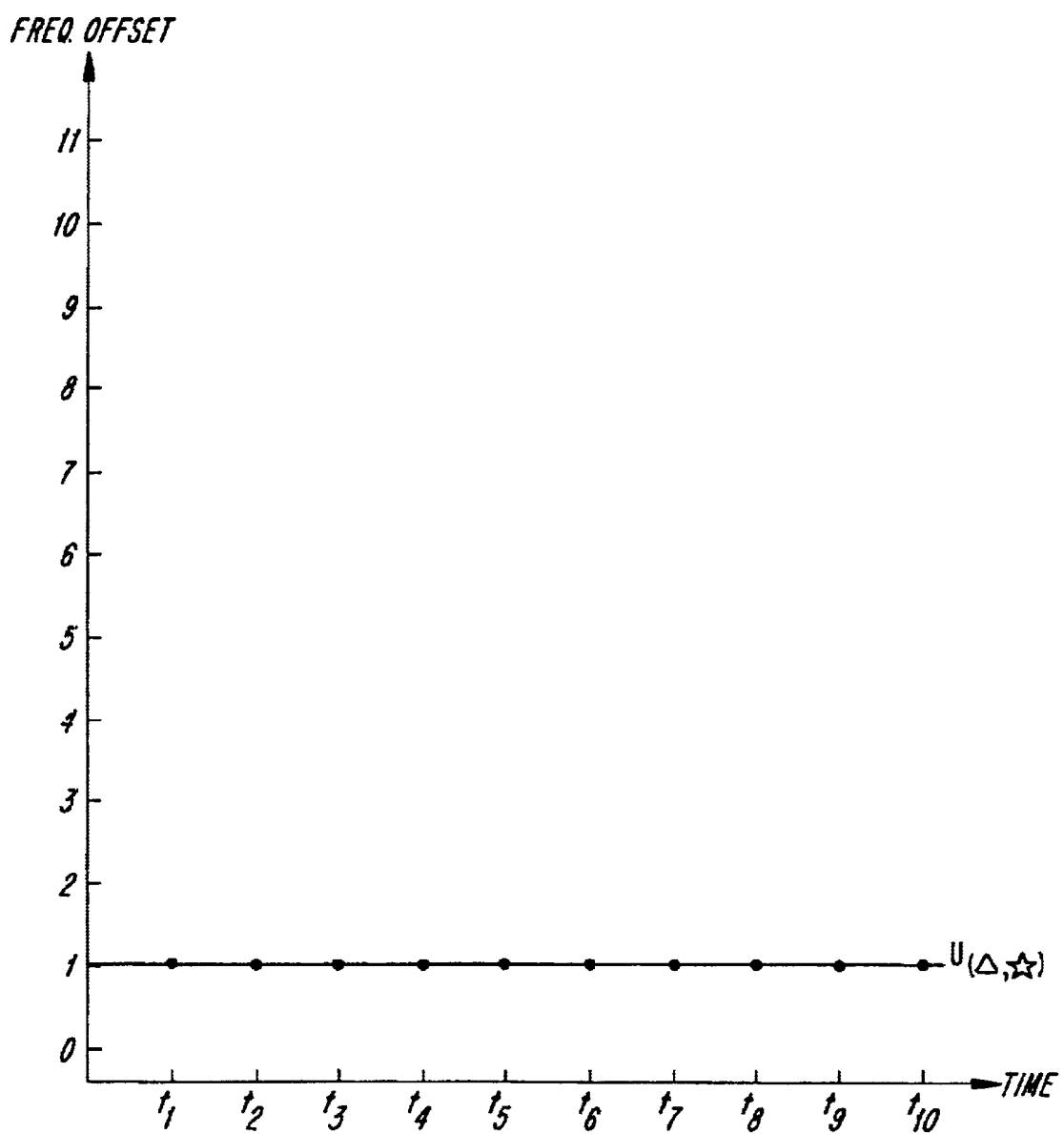

FIG. 4E characterizes the frequency offset between the mobile station represented by the symbol "☆", operating in cell A, and the mobile station represented by the symbol "▲", operating in cell C. The frequency offset between these two mobile stations also is shown to vary over the time period $t_1-t_{10}$. Because the frequency offset between these two mobile stations varies, interference diversity is achieved, and the adjacent channel interference problem characterized by the graph $U_{(▲,☆)}$ appearing in FIG. 3E is mitigated.

Figure 3F:
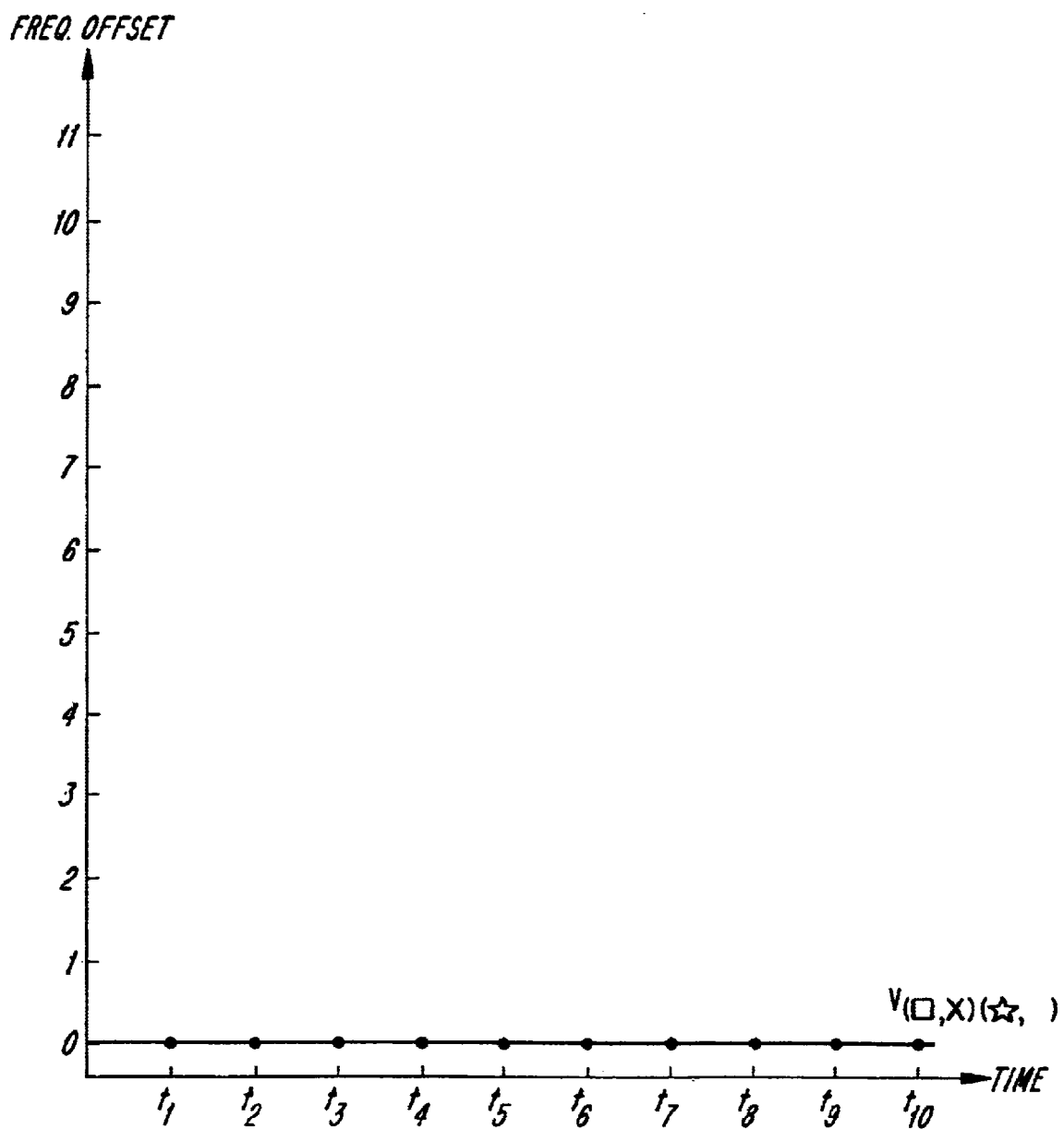

The graph $V'_{(□,X)}$ in FIG. 4F characterizes the frequency offset between the mobile station represented by the symbol "□", operating in cell A, and the mobile station represented by the symbol "X", operating in cell A'. Similarly, the graph $V'_{(☆,●)}$ in FIG. 4F characterizes the frequency offset between the mobile station represented by the symbol "☆", operating in cell A, and the mobile station represented by the symbol "●", operating in cell A'. As indicated by the graph $V'_{(□,X)}$ the frequency offset between the two respective mobile stations represented by the symbols "□" and "X" varies over the time period $t_1-t_{10}$. Likewise, the graph $V'_{(☆,●)}$ indicates that the frequency offset between the two respective mobile stations represented by the symbols "☆" and "●" varies over the time period $t_1-t_{10}$. Again, because the frequency offset between these mobile stations varies, interference diversity is achieved, and the co-channel interference problem reflected by the graph $V_{(□,X),(☆,●)}$ in FIG. 3F is mitigated.

In accordance with another aspect of the present invention, frequence offset hopping sequences may be reused in the same manner that frequencies are reused, as explained above. However, it will be understood that a certain minimum reuse distance may be imposed to avoid co-channel interference.

The present invention has been described with reference to a subset of synchronized cells, as illustrated in FIG. 1, where the frequency offset distribution is shown as being homogeneous. That is, the frequency offsets are distributed amongst the cells, in each group of cells, in accordance with an identical distribution pattern. However, one skilled in the art will readily appreciate the fact that a cell may, if necessary, "borrow" one or more frequency offsets assigned to another cell in the cell group, in order to accommodate traffic conditions and other relevant factors.

The present invention has been described with reference to exemplary embodiments. However, it will be readily apparent to those skilled in the art that it is possible to embody the invention in specific forms other than those described above without departing from the spirit of the invention. For example, the figures illustrate the technique of improving intercell interference diversity in a synchronized, cellular radio telecommunications system that employs a one-reuse plan, though one skilled in the art will appreciate that the present invention is applicable with other reuse plans for reducing both intercell and intracell interference in a synchronized or unsynchronized, cellular radio telecommunications system. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. In a cellular radio telecommunications system, a frequency hopping method comprising the steps of:
   establishing a frequency hopping sequence for each of a plurality of cells;
   assigning a number of frequency offsets to each of the plurality of cells; and
   assigning a first frequency offset hopping sequence to a first mobile station operating in a first one of the plurality of cells, wherein each frequency offset associated with the first frequency offset hopping sequence is one of the number of frequency offsets assigned to the first one of the plurality of cells, and wherein the first mobile station hops from one frequency to the next frequency as a function of the frequency hopping sequence plus the first frequency offset hopping sequence.

2. The frequency hopping method of claim 1 further comprising the step of:
   assigning a second frequency offset hopping sequence to a second mobile station operating in the first one of the plurality of cells, wherein the frequency offset between the first mobile station and the second mobile station varies.

3. The frequency hopping method of claim 1, wherein the cellular radio telecommunications system is a unsynchronized system.

4. The frequency hopping method of claim 1, wherein the cellular radio telecommunications system is a synchronized system.

5. The frequency hopping method of claim 4, wherein the step of establishing a frequency hopping sequence for each of the plurality of cells comprising the step of establishing a reference frequency hopping sequence for the plurality of bells; and
   wherein no two of the plurality of cells are assigned the same frequency offset.

6. In a cellular radio telecommunications system that employs frequency hopping, a method for maximizing interference diversity comprising the steps of:
   establishing a frequency hopping sequence for each of a group of cells, wherein each of the cells contains a base station;
   assigning a number of frequency offsets 0 . . . N–1 to each of the cells; and
   assigning a first frequency offset hopping sequence to a first mobile station operating in a first one of the cells, wherein each frequency offset associated with the first frequency offset hopping sequence is one of the number of frequency offsets assigned to the first cell, and wherein the first mobile station, over a given time period, hops from one frequency to the next frequency as a function of the frequency hopping sequence and the first frequency offset hopping sequence.

7. The method of claim 6 further comprising the step of:
   assigning a second frequency offset hopping sequence to a second mobile station operating in the first cell, wherein the frequency offset between the first mobile station and the second mobile station varies over the given time period.

8. The method of claim 6, wherein the step of assigning a first frequency offset hopping sequence to a first mobile station comprises the step of:
   assigning the first frequency offset hopping sequence to the first mobile station at call set-up.

9. The method of claim 6, wherein the stop of assigning a first frequency offset hopping sequence to a first mobile station comprises the step of:
   assigning the first frequency offset hopping sequence to the first mobile station at handover.

10. The method of claim 6, wherein the cellular radio telecommunications system is a unsynchronized system.

11. The method of claim 6, wherein the cellular radio telecommunications system is a synchronized system.

12. The method of claim 11,
wherein the step of establishing a frequency hopping sequence for each of the cells comprising the step of establishing a reference frequency hopping sequence for the cells; and
wherein no two of the cells are assigned the same frequency offset.

13. In a cellular radio telecommunications system, a frequency hopping apparatus comprising:
means for establishing a frequency hopping sequence for each of a plurality of cells;
means for assigning a number of frequency offsets to each of the plurality of cells; and
means for assigning a first frequency offset hopping sequence to a first mobile station operating in a first one of the plurality of cells, wherein each frequency offset associated with the first frequency offset hopping sequence is one of the number of frequency offsets assigned to the first one of the plurality of cells, and wherein the first mobile station hops from one frequency to the next frequency as a function of the frequency hopping sequence plus the first frequency offset hopping sequence.

14. The frequency hopping apparatus of claim 13 further comprising:
means for assigning a second frequency offset hopping sequence to a second mobile station operating in the first one of the first plurality of cells, wherein the frequency offset between the first mobile station and the second mobile station varies.

15. The frequency hopping apparatus of claim 13, wherein the cellular radio telecommunications system is a unsynchronized system.

16. The frequency hopping apparatus of claim 13, wherein the cellular radio telecommunications system is a synchronized system.

17. The frequency hopping apparatus of claim 16,
wherein the means for establishing a frequency hopping sequence for each of the plurality of cells comprising means for establishing a reference frequency hopping sequence for the plurality of cells; and
wherein no two of the plurality of cells are assigned the same frequency offset.

\* \* \* \* \*